United States Patent
Kamitani et al.

(10) Patent No.: US 7,280,539 B2
(45) Date of Patent: Oct. 9, 2007

(54) DATA DRIVEN TYPE INFORMATION PROCESSING APPARATUS

(75) Inventors: Shingo Kamitani, Tenri (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1061 days.

(21) Appl. No.: 10/197,492

(22) Filed: Jul. 18, 2002

(65) Prior Publication Data

US 2003/0043837 A1    Mar. 6, 2003

(30) Foreign Application Priority Data

Aug. 30, 2001   (JP)   ............... 2001-261684

(51) Int. Cl.
*H04L 12/56* (2006.01)

(52) U.S. Cl. ............... 370/390; 370/392; 370/429; 710/34; 710/35; 712/25; 712/40; 712/225

(58) Field of Classification Search ............... 370/380, 370/381, 382, 428, 429, 395.7; 710/34, 35; 712/25, 32, 40, 225
See application file for complete search history.

(56) References Cited

U.S. PATENT DOCUMENTS

| | | | | |
|---|---|---|---|---|
| 5,117,489 A | * | 5/1992 | Komori et al. ............... 712/201 |
| 5,373,204 A | * | 12/1994 | Muramatsu et al. ........... 326/93 |
| 5,404,539 A | * | 4/1995 | Onozaki ..................... 710/240 |
| 5,438,567 A | * | 8/1995 | Ikeda .......................... 370/417 |
| 5,577,256 A | * | 11/1996 | Muramatsu et al. ........... 712/27 |
| 5,590,355 A | * | 12/1996 | Shichiku et al. ............... 712/26 |
| 5,630,151 A | * | 5/1997 | Muramatsu et al. ......... 712/201 |
| 5,640,525 A | * | 6/1997 | Yumoto et al. .............. 712/201 |
| 5,652,906 A | * | 7/1997 | Kadosumi et al. ............ 712/26 |
| 5,671,213 A | * | 9/1997 | Kurano ........................ 370/218 |
| 5,794,065 A | * | 8/1998 | Hatakeyama et al. ......... 712/26 |
| 5,802,399 A | * | 9/1998 | Yumoto et al. ............... 710/66 |
| 5,812,806 A | * | 9/1998 | Muramatsu et al. ......... 712/201 |
| 5,826,098 A | * | 10/1998 | Kanekura et al. ............. 712/26 |
| 5,848,290 A | * | 12/1998 | Yoshida et al. ............... 712/26 |
| 5,872,991 A | * | 2/1999 | Okamoto et al. ............. 712/26 |
| 6,094,434 A | * | 7/2000 | Kotzur et al. ................. 370/401 |
| 6,222,840 B1 | * | 4/2001 | Walker et al. ............... 370/389 |
| 7,051,194 B2 | * | 5/2006 | Uneyama et al. ........... 712/225 |

FOREIGN PATENT DOCUMENTS

| | | |
|---|---|---|
| JP | 6-83731 | 3/1994 |
| JP | 6-301799 | 10/1994 |

* cited by examiner

*Primary Examiner*—Hassan Kizou
*Assistant Examiner*—Brian T O'Connor
(74) *Attorney, Agent, or Firm*—Birch, Stewart, Kolasch & Birch, LLP

(57) ABSTRACT

In order to perform functional packet copying to read a large amount of data of an unspecified length from a memory at high speed and to prevent the packet copying operation from affecting other packet flow, a self-synchronous transfer control circuit having a function of controlling transfer operation is used, by which the number of packet copies output from a data holding register is managed by a counter, and the number of copies represented by the copy request packet and the counter count value are compared by a comparator, to determine completion of the packet copying operation.

6 Claims, 12 Drawing Sheets

DATA DRIVEN TYPE INFORMATION PROCESSING APPARATUS

BACKGROUND OF THE INVENTION

1. Field of the Invention

The present invention relates to a data driven type information processing apparatus. More specifically, the present invention relates to a data driven type information processing apparatus in which successive copies of a packet flowing through a circulating pipeline is performed reasonably and efficiently.

2. Description of the Background Art

When processing of a large amount of data at high speed is necessary, parallel processing is effective. Among architectures suitable for parallel processing, data driven type architecture has been attracting attention. According to the data driven type processing system, process proceeds in accordance with the rule that "when input data necessary for executing a certain process are all prepared and resources including an arithmetic processor necessary for that process are allocated, the process is executed."

FIG. 10 is a block diagram of a conventional data driven type processing system, and FIG. 11 is a specific block diagram of the data driven type information processing apparatus shown in FIG. 10. FIGS. 12A to 12C represent packet field configurations, in which FIG. 12A represents a basic configuration of PA_IO of the data driven type information processing apparatus, FIG. 12B represents a packet $PA_{13}$ RT flowing through an IO (input/output)/route control unit 10, a firing control unit 11 and a program storing unit 14 in the data driven type information processing apparatus 1, and FIG. 12C represents a configuration of a packet PA_FC flowing through a history processing unit 12 and an operation processing unit 13 in the data driven type information processing apparatus 1.

The packet PA_IO of FIG. 12A includes a field 20 storing a PE number (Processing Element Number: processor number) PE, a field 22 storing a node number ND, a field 23 storing color CL, and a field 24 storing data D. The packet PA_RT of FIG. 12B includes fields 22 to 24 that are similar to those of FIG. 12A, and a field 21 storing an instruction code OP. The packet PA_FC of FIG. 12C includes fields 21 to 23 similar to those of FIG. 12B, a field 25 storing left data LD and a field 26 storing right data RD.

Referring to FIG. 10, the data driven type processing system includes the data driven type information processing apparatus 1, and an external data memory 2 storing a plurality of data. Data driven type information processing apparatus 1 includes input ports IA, IB connected to data transmission paths 3 and 4, respectively, output ports OA, OB connected to data transmission paths 5 and 6, respectively, and a memory port TM connected to an access control line 7.

To data driven type information processing apparatus 1, the packet PA_IO shown in FIG. 12A is time-sequentially input from data transmission path 3 or 4 through input port IA or IB. Data driven type information processing apparatus 1 has prescribed processing contents pre-stored as a program, and a process based on the program contents is executed. When there is an access from memory port TM of data driven type information processing apparatus 1, that is, when a request signal for referencing/updating contents of external data memory 2 is received through access control line 7, external data memory 2 makes an access in accordance with the received access request, and responds to the data driven type information processing apparatus 1 by providing a result.

Data driven type information processing apparatus 1 processes the input packet PA_IO, and after the end of processing, outputs packet PA_IO through output port OA and data transmission path 5, or through output port OB and data transmission path 6.

Data driven type information processing apparatus 1 shown in FIG. 10 includes, referring to FIG. 11, an IO/route control unit 10, a firing control unit 11, a history processing unit 12, an operation processing unit 13 and a program storing unit 14. Firing control unit 11 includes a constant memory 17 and a wait memory 18 necessary for the data driven type processing. An internal memory 15 and an external memory interface 16 are connected to history processing unit 12. Program storing unit 14 includes a program memory, which is also necessary for the data driven type processing.

Referring to FIGS. 12A to 12C, processor number PE represents information for identifying data driven type information processing apparatus 1 at which the corresponding packet PA_IO is to be processed, in a system having a plurality of data driven type information processing apparatuses 1 connected thereto. Node number ND is used as an address for accessing to the contents of constant memory 17 and program memory 19. Color CL is used as an identifier for uniquely identifying a packet time-sequentially input to data driven type information processing apparatus 1, and used for memory address calculation in history processing unit 12.

The operation of the system shown in FIGS. 10 and 11 will be described in the following. When the packet PA_IO shown in FIG. 12A is applied to data driven type information processing apparatus 1 designated by processor number PE through data transmission path 3 or 4, the packet PA_RT of FIG. 12B is output at IO/route control unit 10. Specifically, IO/route control unit 10 discards the field of processor number PE of the input packet PA_IO, based on the node number ND of the input packet PA_IO, obtains the instruction code OP and the next new node number ND which are stored in fields 21 and 22 of PA_RT of FIG. 12B, and transmits the packet PA_RT to firing control unit 11.

Therefore, the packet PA_RT applied from IO/route control unit 10 to firing control unit 11 has such a configuration as shown in FIG. 12B. In IO/route control unit 10, color CL and data D are unchanged.

In firing control unit 11, constant data or packet PA_RT to be paired is detected. Detection of the next packet PA_RT is referred to as "firing". Firing control unit 11 waits for the packet PA_RT applied from IO/route control unit 10 as needed, utilizing wait memory 18. As a result, when there are two packets PA_RT having both node number ND and color CL corresponding to each other, that is, when there are two packets PA_RT forming a pair, data D in field 24 of one packet PA_RT is stored in the field number 25 of packet PA_FC shown in FIG. 12C, the data D in field 24 of the other packet PA_RT is stored in field 26 of packet PA_FC, and the packet PA_FC is transmitted to history processing unit 12.

At this time, one packet PA_RT is erased. Here, when the data to be operated is not the packet PA_RT but constant data, waiting at firing control unit 11 does not take place, the constant data is read from constant memory 17 and stored in either the field 25 or 26 of packet PA_FC, the data D of the packet PA_RT is stored in the other of the fields 25 and 26 of packet PA_FC, and the packet PA_FC is transmitted to history processing unit 12. Therefore, packet PA_FC applied from firing control unit 1 to history processing unit 12 has the configuration shown in FIG. 12C. In firing unit 11, instruction code OP, node number ND and color CL are unchanged.

History processing unit 12 decodes the instruction code OP of packet PA_FC applied from firing control unit 11, and performs a prescribed process based on the result of decoding. When instruction code OP indicates an instruction to access internal memory, the internal memory 15 is accessed, and the packet PA_FC storing the result of accessing in field 25 or 26 is transmitted to operation processing unit 13.

When instruction code OP indicates an instruction to access external data memory, an access request packet is sent to external memory interface 16. In accordance with the contents of the received access request packet, external memory interface 16 accesses the external data memory 2 from TM port through memory access control line 7, receives the result of accessing and transmits a packet to history processing unit 12. As a result, the result of accessing to the external data memory is stored in field 25 or 26 of packet PA_FC representing the instruction to access external data memory, and the packet PA_FC is transmitted to operation processing unit 13. When instruction code OP indicates an instruction not related to the history processing unit 12, operation to each field of packet PA_FC is not performed, and packet PA_FC is transmitted as it is to operation processing unit 13.

Operation processing unit 13 decodes the instruction code OP of packet PA_FC applied from history processing unit 12, and performs a prescribed processing in accordance with the result of decoding. When instruction code OP indicates an instruction to operate the contents of packet PA_FC, a prescribed operation process is performed on the contents (mainly, left data LD and write data RF) of packet PA_FC in accordance with the instruction code OP, the result is stored in the field (mainly, data D of field 24) of the packet PA_RT of FIG. 12B, and packet PA_RT is transmitted to program storing unit 14. Instruction code OP, node number ND and color CL are basically unchanged.

Program storing unit 14 has a program memory 19 storing a data flow program including a plurality of next order instruction codes OP and node numbers ND. Program storing unit 14 receives the packet PA_RT from operation processing unit 13, reads the node number ND of the next order and the instruction code OP of the next order from program memory 19 in accordance with address designation based on the node number ND of the input packet PA_RT, stores the read node number and instruction code OP in areas 22 and 21 of the input packet PA RT, and transmits the packet PA_RT to IO/route control unit 10. The color CL and data D are unchanged.

The IO/route control unit 10 decodes the instruction code OP and the node number ND of the applied packet PA_RT, and determines whether the next order instruction is to be executed in the data driven type information processing apparatus 1 or by an external data driven type information processing apparatus. When it is determined that the instruction should be executed by an external data driven type information processing apparatus, the processor number of the data driven type information processing apparatus of interest is stored in field 20 of packet PA_IO of FIG. 12A, and packet PA_IO is output to OA port or OB port. When it is determined that the instruction should be executed by the data driven type information processing apparatus 1 itself, packet PA_RT is again transmitted to firing control unit 11 as it is.

In this manner, as the packets PA_RT and PA_FC circulate the data driven type information processing apparatus, a process in accordance with the data flow program prestored in program memory 19 proceeds.

In data driven type information processing apparatus 1, packets are transferred in non-synchronous manner by handshake. The process in accordance with the data flow program stored in program memory 19 is executed in parallel, by pipeline processing, as the packets circulate in the data driven type information processing apparatus 1. Thus, in the data driven type processing system, performance of parallel processing by the unit of packet is very high, and flow rate of the packets circulating in the apparatus is one important measure representing the performance of processing.

Recently, the feature of such data driven type information processing apparatus is applied to network protocol processing that requires high speed operation processing of a large amount of data and high speed transfer.

A general network protocol will be described. First, the data transfer and data processing unit in the network protocol processing is referred to as a frame. The data in a frame is mainly classified into a header and a data body. The header represents an area storing information related to the attribute of the data body, including information of the destination and source of the frame, length of the data body and the type of protocol. The data body represents the data itself that is to be actually transmitted. When the size of the information represented by the header is compared with the size of the data body, the ratio of the header occupying the frame is very small, and most of the frame is occupied by the data body.

In the network protocol processing, operation on the data value itself is rare, while in most cases, the manner of handling the data body or output destination of the frame is controlled by analyzing in detail the header portion. Therefore, generally, upon receiving a frame of a large capacity, the processing apparatus first stores the received frame as a whole temporarily in a memory within the processing apparatus, takes out the header portion therefrom, and executes a prescribed protocol processing within the processing apparatus. Here, the memory in the processing apparatus corresponds to the external data memory 2 of the data driven type information processing apparatus 1.

The processing apparatus for a network protocol is required of executing the above described frame operation at high speed with high efficiency. For this purpose, it is necessary after the completion of header processing, to take out the frame as a whole from the memory, and transmit the frame to the outside of the processing apparatus, by an output method in accordance with the result of processing. Specifically, in data driven type information processing apparatus, using one packet (PA_RT of FIG. 12B) indicating completion of header processing as a trigger, it is necessary to read the frame stored in the external data memory 2 at high speed with high efficiency. In a data driven type information processing apparatus, basically, only a memory data of 1 word can be read from one trigger packet PA_RT.

Therefore, in a data driven type information processing apparatus, a function of high speed memory burst reading and a function of packet successive copying become necessary. It is noted, however, that temporary and abrupt increase in packet number associated with burst reading from a memory of a certain frame or associated with successive copying of packets must not affect the flow of the packet related to header processing of other frames, causing degradation in header processing performance. Further, the data length of a frame is at fixed, as represented by the header. Thus, the number of memory burst reading and the number of successive copying of the packets should not be fixed by the program but must be dynamically changed, in accordance with the contents of the trigger packet PA_RT. Further, when a frame is read from the memory and the frame is transmitted to the outside of the processing apparatus, it is desired that a receiving device outside the processing apparatus easily identifies a terminating end of the frame.

In a conventional data driven type information processing apparatus, when data of a large capacity is to be read from the external data memory 2 using one trigger packet PA_RT, the packet PA_RT is successively and repeatedly copied by a software, that is, copied one by one by the program storing unit 14 of FIG. 11, and memory access is performed using each of the copied plurality of packets PA_RT as a base. Here, in order to copy one trigger packet PA_RT, the time corresponding to one circulation through the circulating pipeline of the data driven type information processing apparatus 1 shown in FIG. 11 is necessary. Therefore, a long time is necessary for reading the entire frame, and hence this approach is not practical.

In another approach, a burst reading or a packet copy function is provided by a hardware at the history processing unit 12 or the operation processing unit 13 shown in FIG. 11. In this approach, however, the processing unit performs autonomous and non-synchronous packet copying, and therefore, the number of packets increases temporarily and abruptly at a pipeline ahead of the processing unit. This is a bottleneck that affects the packets at the downstream of the processing unit, that is, affects the packet flow not related to the burst reading or packet copying, causing packet convergence or stall of the processor within the data driven type information processing apparatus.

In order to prevent packet convergence and process stall described above, provision of a hardware to realize the function of monitoring packet convergence contents in the processing apparatus or to implement a packet counter has been proposed. This approach, however, also presents a problem that it acquires hardware cost.

SUMMARY OF THE INVENTION

Therefore, an object of the present invention is to provide a data driven type information processing apparatus in which functional packet copying is performed to read a large amount of data of an unspecified length at high speed from a memory, with the packet copying not affecting other packet flow.

Briefly stated, the present invention provides a data driven type information processing apparatus including a packet copy circuit copying a packet successively, and in the packet copy circuit, transfer operation is controlled at an arbitrary timing by a self-synchronous transfer control circuit, upon input of a copy request packet, a packet is copied one by one by the copy circuit in synchronization with a clock signal from the self-synchronous transfer control circuit, the number of copied packets is counted by a counter circuit, the number of copies designated by the copy request packet is compared with the copied number counted by the counter circuit, by means of a comparing circuit, and when a designated number of copies is obtained, end of a copying operation is determined.

Thus, the contents of the input packet can be copied and output by the time interval corresponding to the synchronizing clock period of the self-synchronous transfer control circuit. The time interval of packet copying by a software corresponds to the circulation time of the circulating pipeline in a data driven type information processing apparatus. Therefore, the time interval of copying based on the synchronizing clock can be made one or two orders of magnitude smaller than the time interval of packet copying realized by a software. Further, the time interval of copying can be set arbitrarily and freely, by changing the period of the synchronizing clock. Therefore, when the period of the synchronizing clock is made sufficiently smaller than the packet transfer time in the pipeline of the data driven type processing apparatus, the rate of packet copying based on the synchronizing clock does not exceed the upper limit, that is, the synchronizing clock frequency, and hence, excessive packet convergence caused by an excessive number of packet copying or stalling of the processor can naturally be prevented.

More preferably, every time a packet is copied by the copy circuit, a prescribed updating operation by a packet updating circuit is performed on a value of a certain area in the copied packet, every time a copy is taken, starting from the copy request packet.

Therefore, when an operation of updating a field related to address information of the output packet is performed in accordance with a certain rule, using the value of a count circuit as the value of the certain area, it becomes possible to access to different memory addresses, and hence, burst access to the memory is realized.

More preferably, when the number of copies of the packet designated by the copy circuit is done, a certain area of the last copied packet is subjected to a predetermined updating operation.

Accordingly, when an indefinite number of burst accesses to the memory is performed, it is possible, by making a reference to a certain field of memory access result packets output successively, to detect the last packet among the unspecified number of memory access result packets in a simple manner, because updating of the field can be determined.

More preferably, a branching circuit branching a circulating packet and a copy request packet and applying the copy request packet to the copy circuit is provided on the input side of the copy circuit, and the branch circulating packet and the packet copied by the copy circuit are merged by a merge circuit.

Thus, the original circulating packet related to the process of the data driven type information processing apparatus as a whole is not hindered by the operating packet copy circuit, and the circulating packet flows independently from the packet copy circuit.

Because of this arrangement, the bandwidth of the original packet transfer related to the process of the data driven type information processing apparatus as a whole at a pipeline portion immediately downstream of merging, in the succeeding stage of the packet copy circuit, is guaranteed, with the value obtained by subtracting the synchronizing clock frequency from the pipeline packet transfer rate of the data driven type information processing apparatus being the lower limit. Therefore, as long as the guaranteed bandwidth is considered in forming the program or when introducing packets to the data driven type information processing apparatus while executing the program, it is possible to prevent excessive convergence of packets or processor's stalling, without the necessity of implementing dynamic packet convergence monitoring mechanism during execution of the program or a special hardware such as a packet counter for managing convergence.

Further, a storage circuit is provided between the branching circuit and the copy circuit, and the copy request packet is successively stored in the storage circuit and applied to the copy circuit.

When an FIFO is used as the storage circuit, copy request packets in the waiting state can be absorbed by the FIFO, even if a copy request packet is put in a waiting state as a packet copy circuit is in operation in the pipeline on the input side of the packet copy circuit. When a plurality of copy request packets arrive continuously to the packet copy circuit, the copy request packets in the waiting state would reach and stay in the pipeline on the output side of the branching circuit, hindering progress of the original circulating packet in the circulating pipeline of the data driven type information processing apparatus. By the provision of the FIFO, propagation of packet stay to the pipeline on the output side of the branching circuit can be suppressed.

Preferably, the packet includes an instruction field, a node number field and a data field, and the data field represents the number of copies of the packet. Thus, the packet can serves as a copy request packet.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
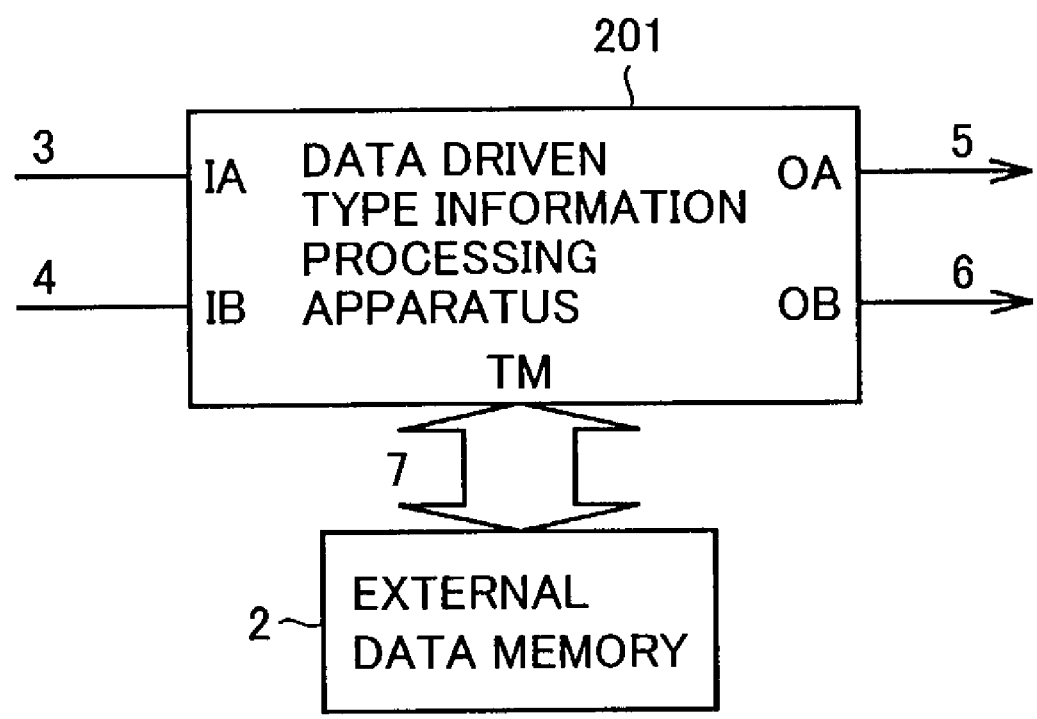
FIG. 1 is a block diagram representing a system configuration of a data driven type information processing apparatus in accordance with one embodiment of the present invention.
Figure 2:
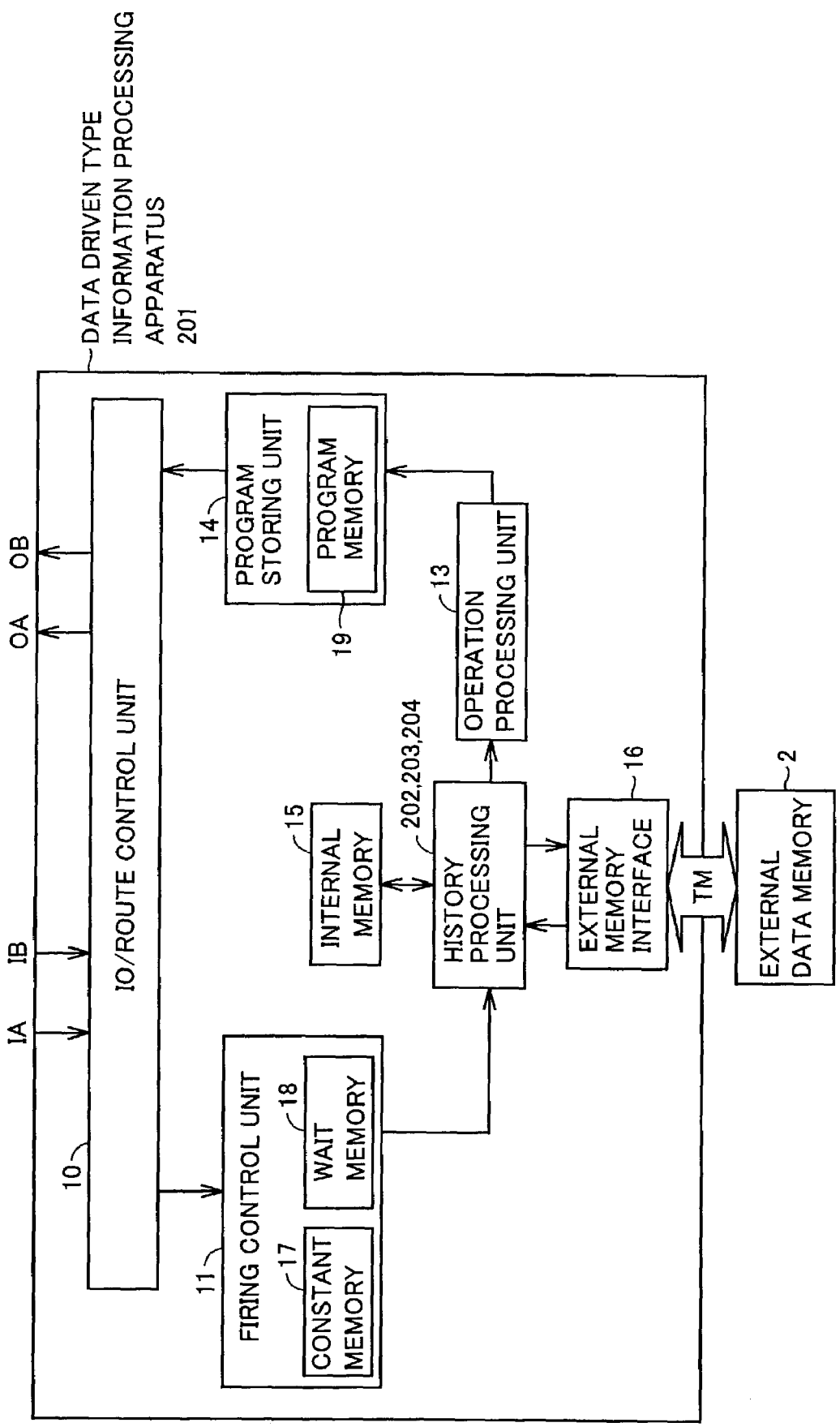
FIG. 2 represents an internal block configuration of a data driven type information processing apparatus in accordance with one embodiment of the present invention.
Figure 10:
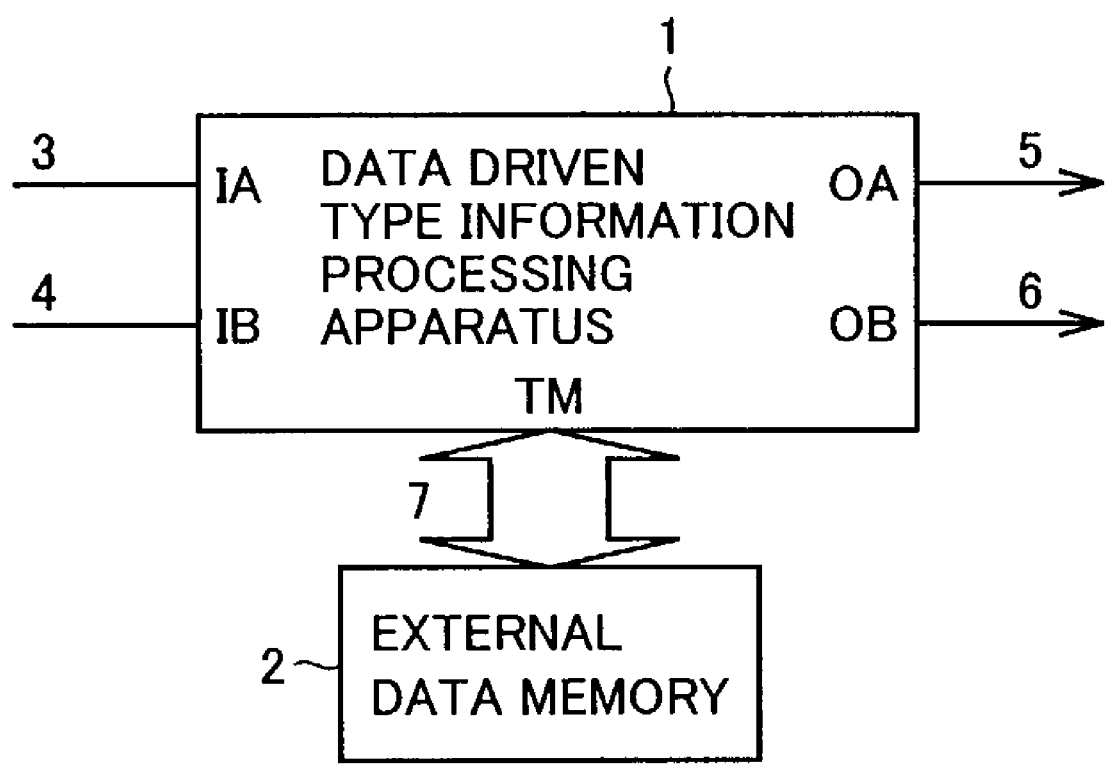
FIG. 10 is a block diagram representing system configuration of a conventional data driven type information processing apparatus.
Figure 11:
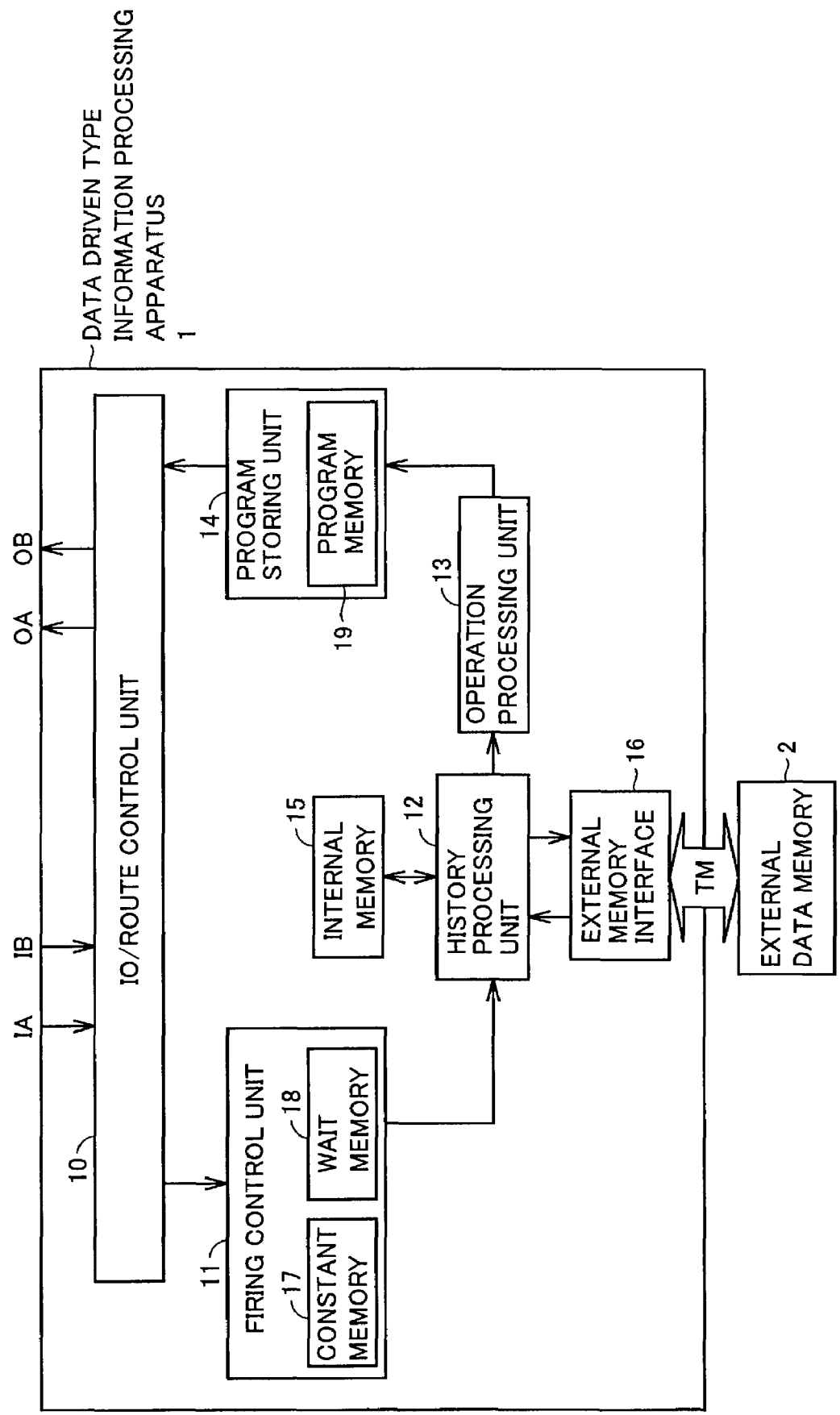
FIG. 11 is an internal block diagram of the data driven type information processing apparatus shown in FIG. 10.

The system shown in FIG. 1 corresponds to FIG. 10 of the prior art described above, and the data driven type information processing apparatus 201 shown in FIG. 2 corresponds to the data driven type information processing apparatus 1 shown in FIG. 11, except that the data driven type information processing apparatus 1 has history processing portion 12, whereas the data driven type information processing apparatus 201 shown in FIG. 2 has any of history processing units 202, 203 and 204, in place of history processing unit 12. Except for this point, the configuration is the same as that of data driven type information processing apparatus 1. Therefore, description thereof will not be repeated.

Figure 3:
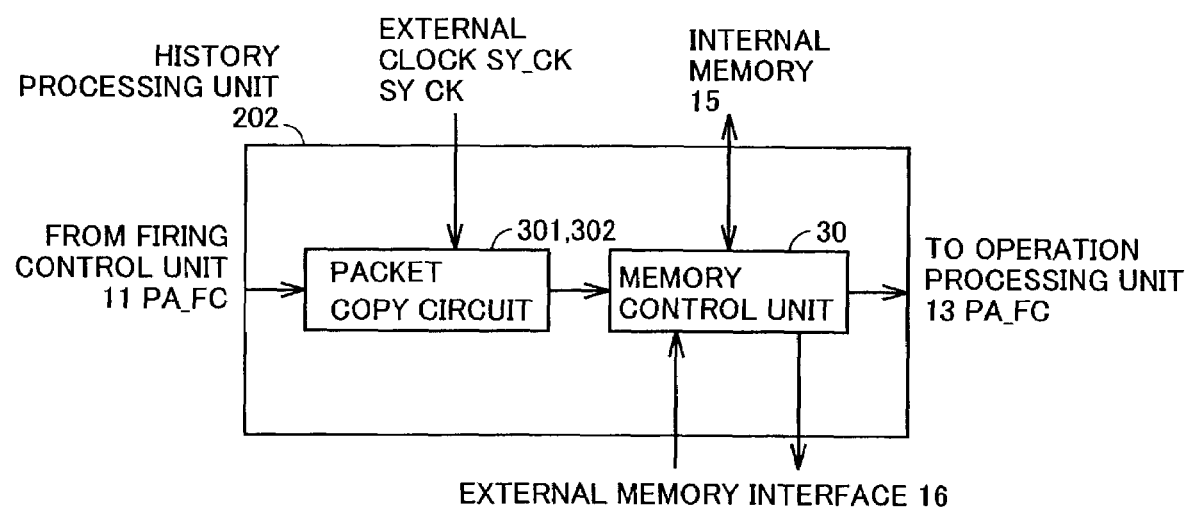
FIG. 3 is a block diagram of the history processing unit shown in FIG. 2.

FIG. 3 is a block diagram of the history processing unit shown in FIG. 2. Referring to FIG. 3, history processing unit 202 has a packet copy circuit 301 shown in FIG. 4 or a packet copy circuit 302 shown in FIG. 5, and a memory control unit 30. To packet copy circuit 301 or 302, an external clock signal SY_CK is input as the synchronizing clock signal. The history processing unit 202 shown in FIG. 3 is different from the history processing unit 12 shown in FIG. 11, in that it additionally includes packet copy circuit 301 or 302 including an external clock signal SY_CK input. Memory control unit 30 is the same as that of the conventional history processing unit 12, and performs similar operation.

Figure 4:
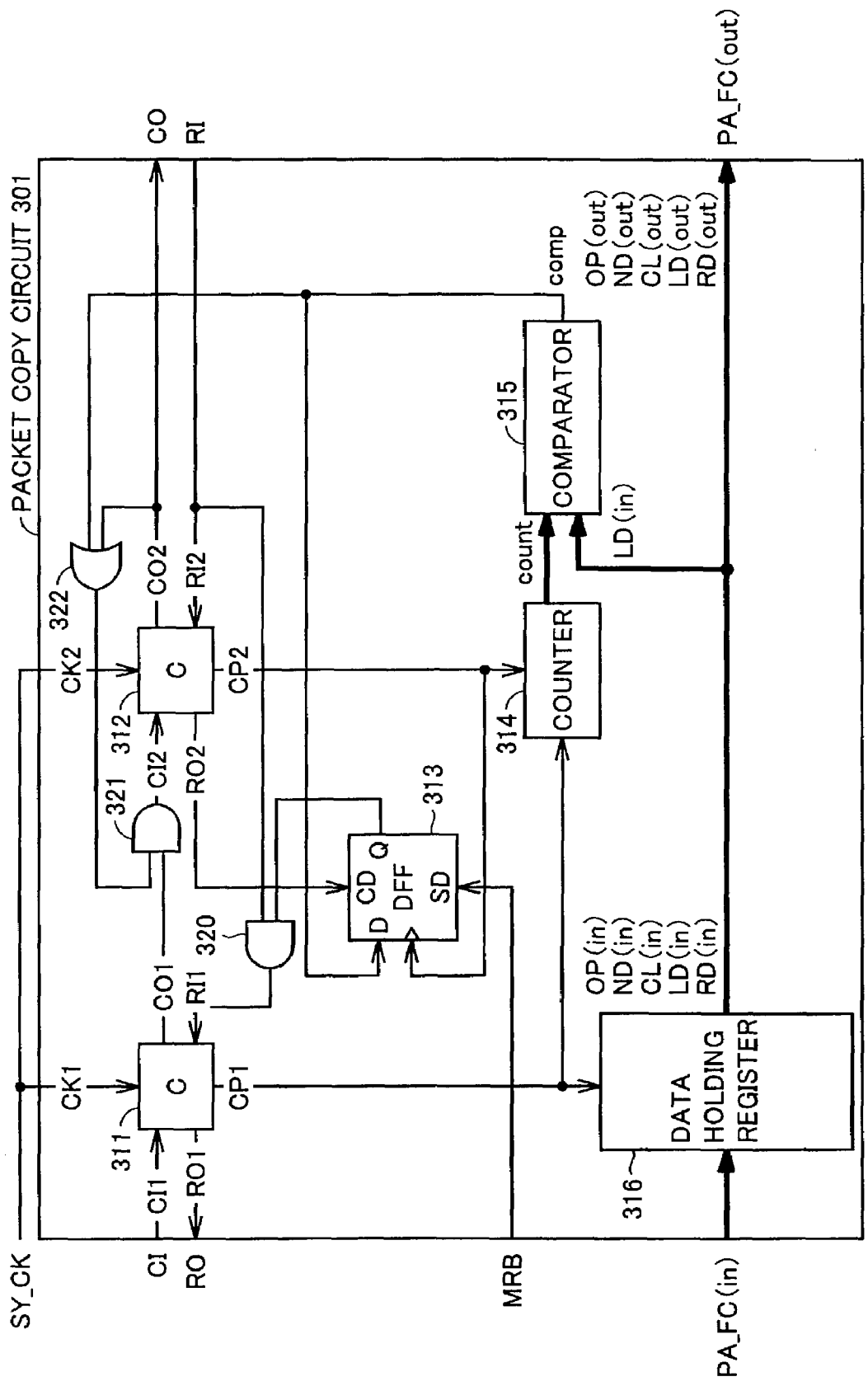
FIG. 4 is a block diagram showing an example of the packet copy circuit shown in FIG. 3.

FIG. 4 is a specific block diagram of the packet copy circuit shown in FIG. 3. Referring to FIG. 4, packet copy circuit 301 includes: self-synchronous transfer control circuits 311, 312; a counter 314 counting the number of packet copies; a data holding register 316 holding a packet PA_FC to be input to packet copy circuit 301; a comparator 315 comparing the value of counter 314 with the value of a data field LD in data holding register 316; and a D type flip-flop 313 with a set·reset, holding the value of the result of comparison comp provided by comparator 315.

Figures 12A, 12B, 12C:
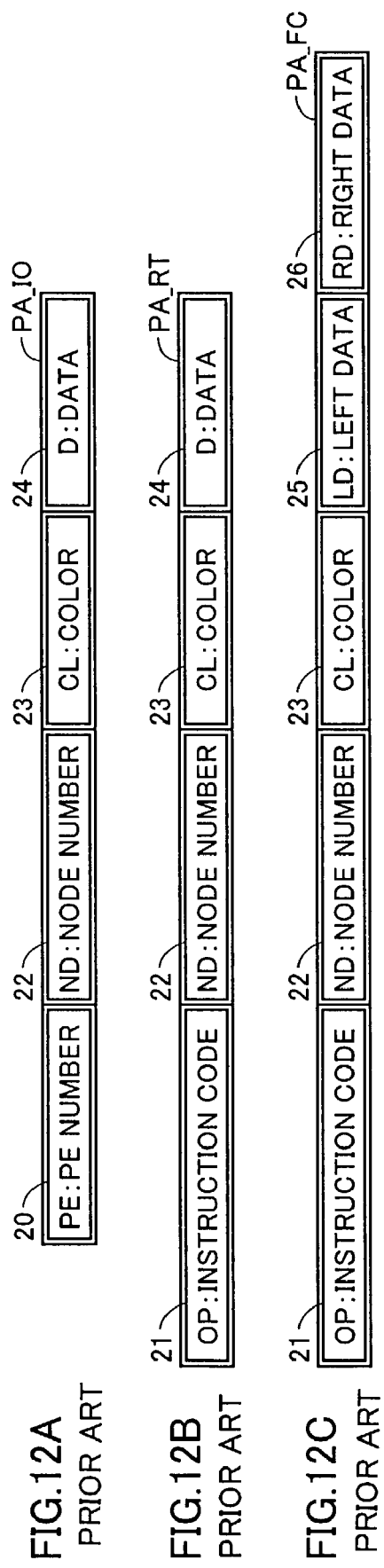
FIGS. 12A to 12C represent field configuration of packets processed in the data driven type information processing apparatus of the prior art and of an embodiment of the present invention.

To packet copy circuit 301, the clock signal SY_CK is input from the outside. As a control signal for self-synchronous transfer control circuits 311, 312, signal lines CI and RI are input from the outside, while signal lines CO and RO are output to the outside. Further, a set signal line MRB of the D type flip-flop 313 with set·reset is input from the outside. From a data input line PA_FC (in), the packet PA_FC shown in FIG. 12C described with reference to the prior art is input, and similarly, the packet PA_FC shown in FIG. 12B is output from a data output line PA_FC (out).

Figure 5:
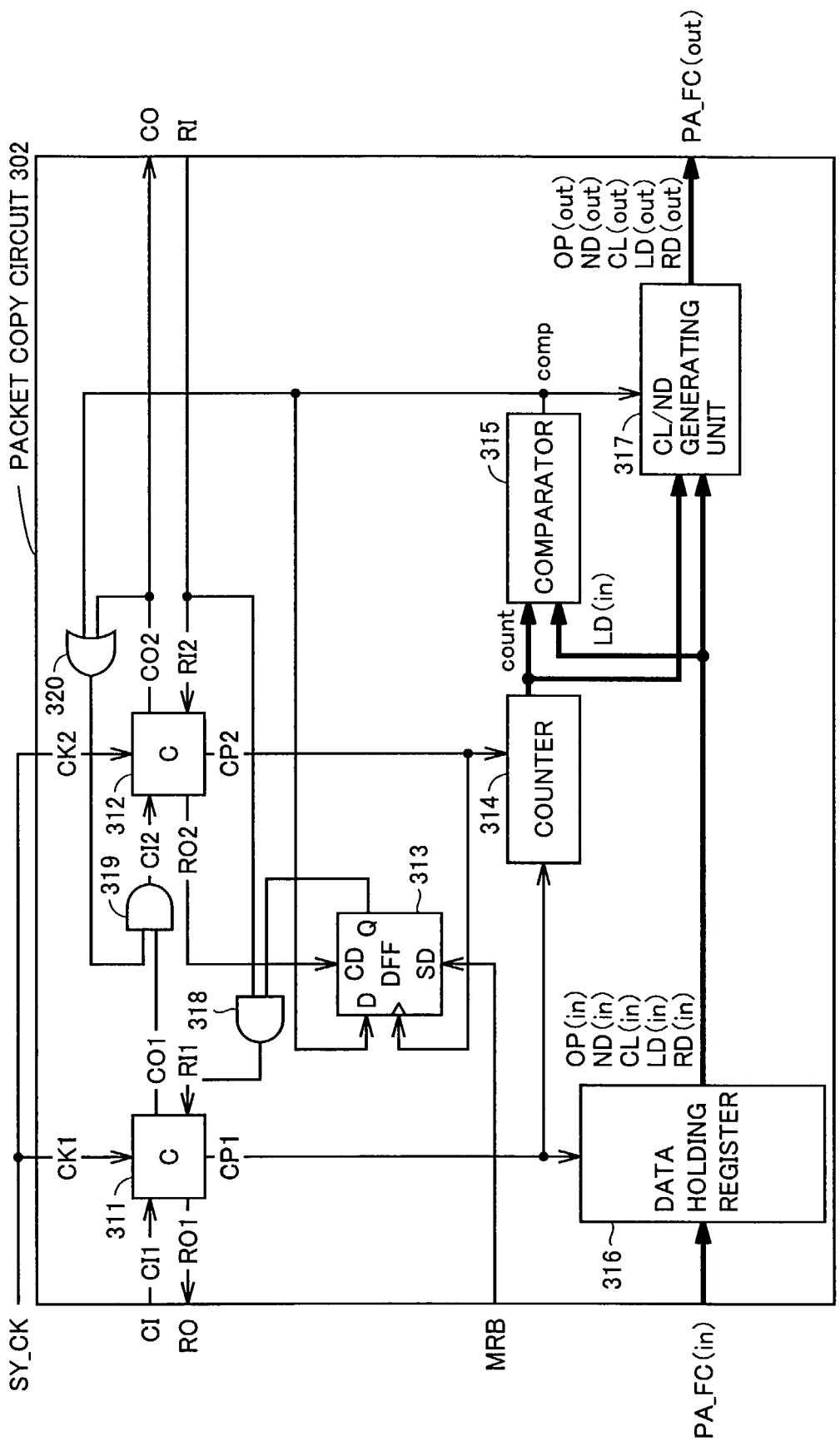
FIG. 5 is a block diagram showing another example of the packet copy circuit.
Figure 6:
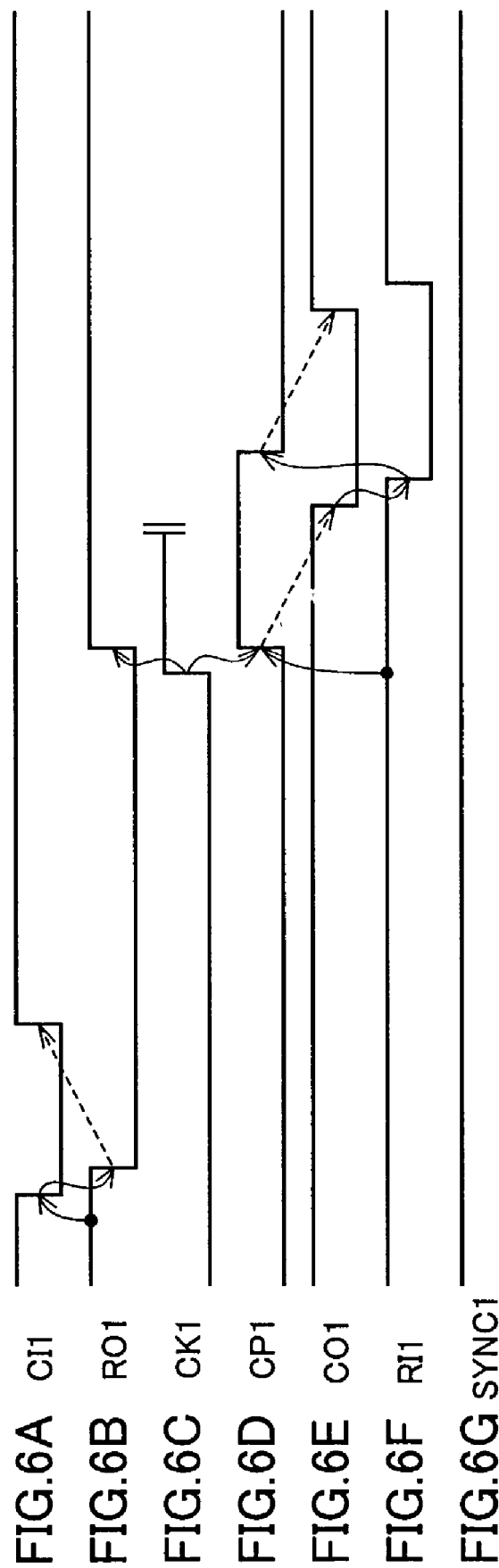
FIGS. 6A to 6G are timing charts of the self-synchronous transfer control circuit.

The packet copy circuit 302 shown in FIG. 5 has the same configuration as packet copy circuit 301 shown in FIG. 4 except that a CL/ND generating unit 317 is additionally provided for operating the color CL and node number ND of the copied packet.

The self-synchronous transfer control circuits 311 and 312 correspond to the self synchronous transfer control circuit described in Japanese Patent Laying-Open No. 6-83731, which is used set in a mode in which a transmission of a transfer request signal is controlled based on a clock signal applied to a terminal CK, with a terminal SYNC being set at SYNC="H".

FIGS. 6A to 6G represent signal timings of the self-synchronous transfer control circuit 301. The signal timings of self-synchronous transfer control circuit 312 are also the same as those shown in FIGS. 6A to 6G. Details of the internal circuitry of self-synchronous transfer control circuits 311 and 312 are given in Japanese Patent Laying-Open No. 6-83731, and U.S. Pat. No. 5,373,204, which corresponds thereto. Therefore, description will not be given here.

The D type flip-flop 313 with set-reset includes a data input signal line D, a data output signal line Q, a set signal line SD and a reset signal line CD. Data output signal Q makes a transition to "H" level at the fall of the set signal SD, and to the "L" level at the fall of the reset signal CD. The data output signal Q changes to the value of the data input signal D, at a rise of the pulse signal input CP2. A counter 314 has its value reset to "0" at a rise of pulse input CP1, and the value is incremented one by one, at a rise of pulse input CP2. Comparator 315 compares the input signal count and the input signal LD (in). When the values match, the comparator provides an output signal comp of "H" level, and when the values do not match, provides the signal at "L" level.

The CL/ND generating unit 317 shown in FIG. 5 receives as inputs the contents of packet PA_FC (in) held by data holding register 316, the counter value count of counter 314, and the output signal comp of comparator 315, and outputs a packet PA_FC (out). The packet PA_FC (in) includes fields OP (in), ND (in), CL (in), LD (in) and RD (in). The packet PA_FC (out) includes fields OP (out), ND (out), CL (out), LD (out) and RD (out). To the CL (out) of the output PA_FC (out), the value CL (in)+count 1 is applied. In ND (out), the value ND (in)+1 is applied when the signal comp is at the "H" level, and the value ND (in) is applied as it is when the signal comp is at the "L" level. In fields OP (out), LD (out) and RD (out), the values OP (in), LD (in) and RD (in) are applied as they are.

When a copy request packet is input from data input line PA_FC (in), the packet copy circuit 301 shown in FIG. 4 copies the packet by the number indicated by the value (=N) of the left data LD of packet PA_FC (in), and outputs N packets from data output line PA_FC (out). In this arrangement, the packet configuration of PA_FC (in) is the same as the packet configuration of PA_FC (out). In the packet copy circuit 302 of FIG. 5, the value of color CL of copied N packets PA_FC (out) will be such that the CL of the first output packet is the same as the value CL of packet PA_FC (in), and the CL of the second and the following output packets will be CL+1, CL+2, . . . , and the CL of the Nth output packet will be (CL+(N−1)). As to the value of node number ND of copied N packets PA_FC (out), the ND of the first to (N−1)th output packets is the same as the value ND of the packet PA_FC (in), and the ND of the Nth output packet only will be ND+1.

As to the instruction code OP and left and right data LD and RD of N packets PA_FC (out), the same values as LD and RD of packet PA_FC (in) are output.

Figure 7:
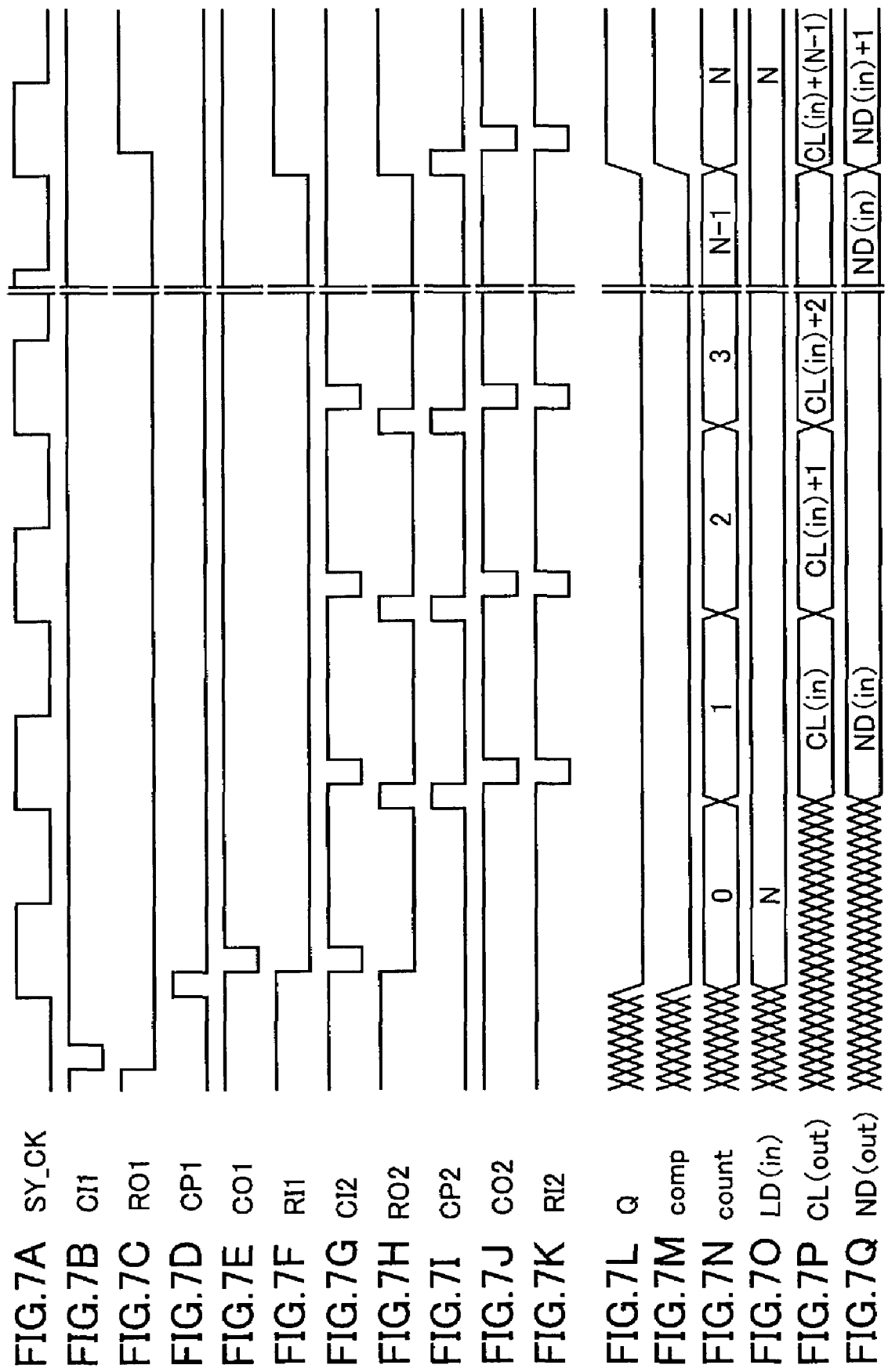
FIGS. 7A to 7Q are timing charts of the packet copy circuit shown in FIG. 5.

FIGS. 7A to 7Q represent signal timings when a packet is input, taking said packet PA_FC (in) as an example, input to packet copy circuit 302 shown in FIG. 5. In the following, a specific operation of the packet copy circuit will be described with reference to FIGS. 7A to 7Q. The operation of packet copy circuit 301 shown in FIG. 4 is the same as the operation of packet copy circuit 302 except that the CL/ND generating unit 317 is not provided and that packet PA_FC (out) is output in the same configuration as packet PA_FC (in). Therefore, the description will not be repeated.

First, assume that the control signal CI (=CI1) of FIG. 7B, RO (=RO1) of FIG. 7C, CO (=CO2) of FIG. 7J and RI (=RI2) of FIG. 7K are all at the "H" level. This state represents that the packet copy circuit is capable of receiving the next packet PA_FC (in).

In the above described state, first, self-synchronous transfer control circuit 311 operates, and when transfer request signal CI (=CI1) attains to the "L" level, then transfer acknowledge signal RO (=RO1) attains to the "L" level and, thereafter, in synchronization with the next rise of synchronizing clock signal SY_CK (=CK1) of FIG. 7A, a pulse output signal CP1 of FIG. 7D attains to the "H" level, and a copy request packet PA_FC (in) is input from data input line PA_FC (in).

The contents of the input packet PA_FC (in) are held by data holding register 316. Simultaneously, by the pulse output signal CP1, the value of counter 314 is reset to "0". Here, as the transfer acknowledge signal RO (=RO1) is at the "L" level, input of the next packet PA_FC (in) to packet copy circuit 302 is not accepted.

Thereafter, transfer request signal CO1 of FIG. 7E and transfer acknowledge signal RI1 of FIG. 7F attain to the "L" level. The change in CO1 is propagated to self-synchronous transfer control circuit 312, the transfer request signal CI2 of FIG. 7G attains to the "L" level, and the transfer acknowledge signal RO2 of FIG. 7H attains to the "L" level. In synchronization with the next rise of synchronizing clock signal SY_CK (=CK2), the pulse output signal CP2 of FIG. 7I attains to the "H" level, and counter 314 operates. Counter 314 increments, at the rise of pulse output signal CP2, the counter count by 1 as shown in FIG. 7N. Here, comparator 315 compares the increment value count and the value of data holding register LD (in), and when the values match, the output signal comp of FIG. 7M attains to "H" level and when they do not match, the output signal comp attains to the "L" level.

The output signal comp of comparator 315 is propagated to CL/ND generating unit 317, and each field of the output packet PA_FC (out) is generated in accordance with the rule described above. Separately, the output signal comp of comparator 315 is propagated to transfer request signal CI2 of self-synchronous transfer control circuit 312. At this time, when comp="L" level, the transfer request signal CI2 changes to the "L" level, packet copy operation by the transfer request is continued, and when comp="H" level, transfer request signal CI2 is kept at the "H" level, transfer request is not issued, and packet copy operation is stopped.

Further, the output signal comp of comparator 315 is propagated to data input D of D type flip-flop 313 with set·reset, as well as to data output Q of FIG. 7L. While the value of data output Q is at the "L" level, the transfer acknowledge signal RI1 of self-synchronous transfer control circuit 311 is also at the "L" level, and therefor, input of the next packet PA_FC (in) to packet copy circuit 302 is not accepted.

In this manner, every time the synchronizing clock signal SYN_CK (=CK2) rises, the above described copying operation of the packet PA_FC takes place. The successive copying operation for one copy request packet PA_FC (in) is completed when the value of the output signal comp of comparator 315 attains to the "H" level. When the signal comp="H" level, the transfer request signal CI2 of self-synchronous transfer control circuit 312 is kept unchanged at "H" level, and the next packet copying operation is not performed.

The value comp is propagated to data output signal Q of D type flipflop 313 with set·reset. When the value of data output Q attains to the "H" level, as the value of transfer acknowledge signal RI1 is determined by the state of transfer acknowledge signal RI2 of self-synchronous transfer control circuit 312, when the packet copying operation controlled by the self-synchronous transfer control circuit 312 is fully completed and the copied packet are all transferred to the pipeline ahead, the signal RI2 attains to the "H" level and accordingly the signal RI1 also changes to the "H" level, and input of the next packet PA_FC (in) to the packet copy circuit 302 is allowed.

Next, the history processing units 202, 203 and 204 using the above described packet copy circuit 302 or 301 will be described.

The history processing unit 202 shown in FIG. 3 includes, connected in series, the above described packet copy circuit 302 or 301, an internal memory 15, and a memory control unit 30 having access means to external data memory 2. To the packet copy circuit 302 (301), external clock signal SY_CK is input. When the packet PA_FC is input from firing control unit 11 and the instruction code OP of said packet indicates a packet copy, in packet copy circuit 302 (301), the packet is copied by the value indicated by the left data LD shown in FIG. 70, and copied packets are output in synchronization with the external clock signal SY_CK.

Here, when the packet transfer rate among all the pipeline stages in data driven type information processing apparatus 201 is 140 MHz, the rate of the external clock signal SY_CK is set to a value slower than said transfer rate (about 33 MHz). The packet PA_FC copied by packet copy circuit 302 (301) and the passed packet PA_FC are transferred to memory control unit 30, and a prescribed memory access operation takes place, in accordance with the instruction code OP.

In the configuration shown in FIG. 3, while the packet copy circuit 302 (301) is in a copying operation, not only a later arrived packet PA_FC but also a packet PA_FC which is not related to the packet copy circuit 302 (301) and simply passed therethrough are kept waiting at the entrance of packet copy circuit 302 (301), and the output rate from packet copy circuit 302 (301) is defined by the rate of the external clock signal SY_CK. Therefore, the overall processing performance of data driven type information processing apparatus 201 is affected.

Figure 8:
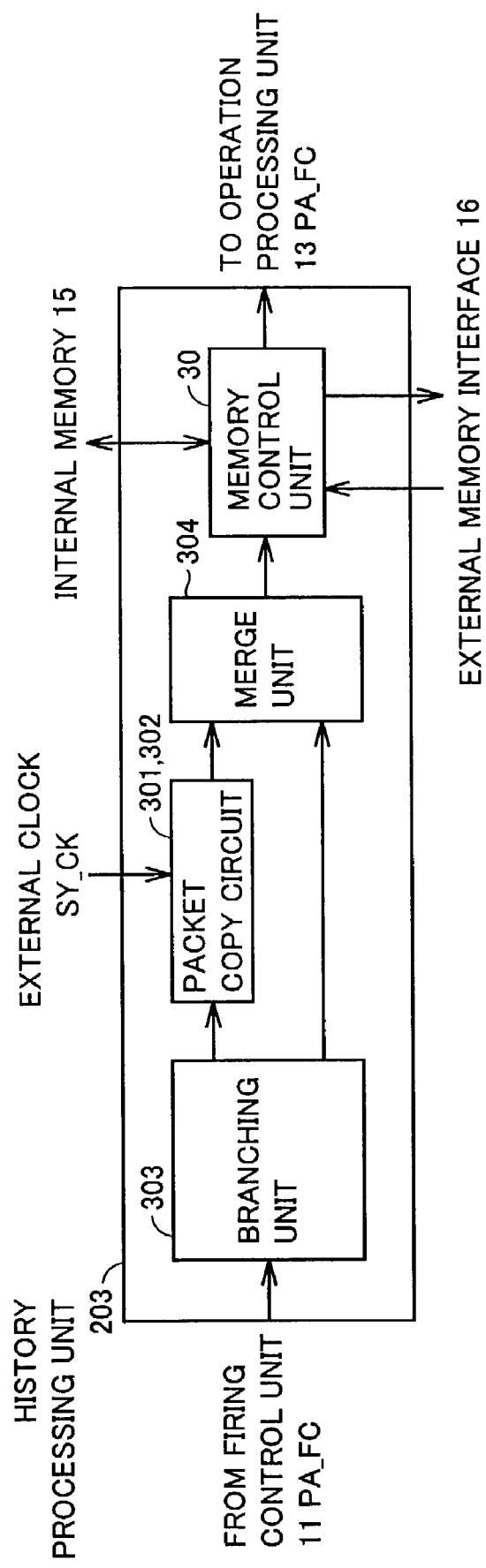
FIG. 8 is a block diagram of the history processing unit improved from the configuration of the history processing unit shown in FIG. 3.

Such a problem is solved by the history processing unit 203 shown in FIG. 8. The history processing unit 203 shown in FIG. 8 differs from the history processing unit 202 of FIG. 3 in that a branching unit 303 and a merge unit 304 are newly arranged before and after the packet copy circuit 302 (301). Branching unit 303 refers to the instruction code OP of the packet PA_FC arriving from firing control unit 11, and when the instruction code OP represents a packet copy, transfers the packet to the packet copy circuit 302 (301), and transfers other original circulating packets related to the processing of the data driven type information processing apparatus as a whole to the other side.

In the configuration shown in FIG. 8, even when the packet copy circuit 302 (301) is in operation, a packet PA_FC not related to the packet copy circuit 302 (301) is passed from the branching unit 303 to a separate path, and therefore, the operation of the packet copy circuit 302 (301) does not directly affect the flow of original circulating packets related to the processing by the data driven type information processing apparatus as a whole.

Now, when copy request packets PA_FC arrives successively at packet copy circuit 302 (301) in a very short period of time, the second and the following copy request packets cannot enter the packet copy circuit 302 (301) until the first copying process is completed, but are kept at the entrance. It follows that such packets are kept waiting in series within the pipeline of the data driven type information processing apparatus 201, and in the worst case, packets in the state of waiting for the pipeline processing of the next stage extend from the packet copy circuit 302 (301) to the entrance of branching unit 303, even hindering the branch progress of packets PA_FC not related to the packet copy circuit 302 (301).

Figure 9:
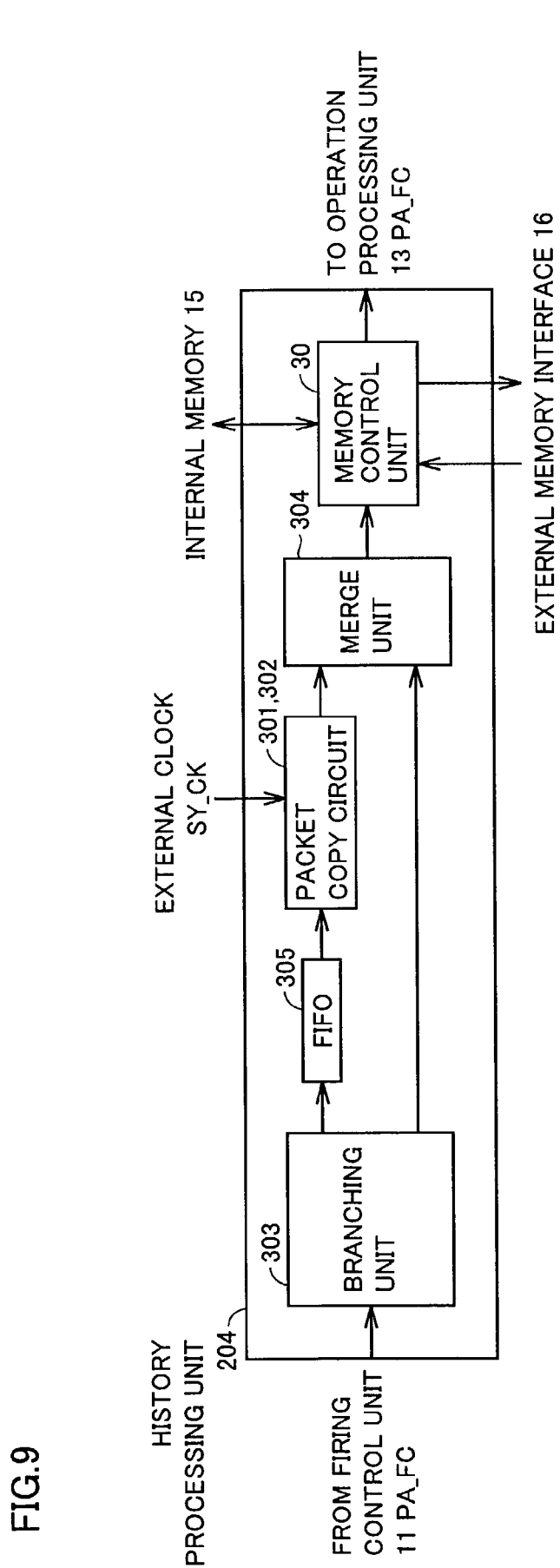
FIG. 9 is a block diagram of the history processing unit having a packet FIFO arranged therein, in addition to the history processing unit of FIG. 8.

The problem is solved by the history processing unit 204 shown in FIG. 9. The history processing unit 204 is different from the history processing unit 203 of FIG. 8 in that between branching unit 303 and packet copy circuit 302 (301), a packet FIFO 305 is newly provided. Packet FIFO 305 is a first-in, first-out buffer for the packets PA_FC, formed in a pipeline of a number of stages as a whole (stages larger in number than necessary, about 4 stages for a typical application), with one pipeline stage corresponding to buffering of one packet. The packet PA_FC input to packet FIFO 305 proceeds successively to the next pipeline when the pipeline of the next stage is empty, and when the transfer acknowledge signal RO of packet copy circuit 302 (301) is at the "H" level, the packet is input to packet copy circuit 302 (301).

The operation after the packet is input to packet copy circuit 302 (301) is as described above. When transfer acknowledge signal RO is at "L" level, the packet waits in packet FIFO 305 until the signal RO attains to the "H" level. In the configuration shown in FIG. 9, even when copy request packets PA_FC successively arrive in a very short period of time, packet FIFO 305 absorbs the above described packets PA_FC, and therefore, the problem experienced by the history processing unit 203 shown in FIG. 8 that a plurality of copy request packets wait in a line in front of the packet copy circuit 302 (301) blocking input to the branch unit 303, can be solved. The number of packets that can be accommodated by packet FIFO 305, that is, the number of pipeline stages in FIFO may appropriately be changed in accordance with the frequency of arrival of the packet copy requests in practice.

At the merge unit 304 of FIG. 9, the copied packets PA_FC (out) from packet copy circuit 302 (301) and the original packets PA_FC of the circulating pipeline that have been branched to the outside are merged and input together to memory control unit 30. Each of the packets PA_FC (out) copied by packet copy circuit 302 (301) has its instruction code OP referred to by memory control unit 30, a prescribed memory access operation is executed thereon, and the result of operation is output in the form of a packet PA_FC from memory control unit 30 and transferred to next operation processing unit 13. When it is found as a result of reference to the instruction code OP that the packet is not related to the memory access, no operation is executed at memory control unit 30, and the packet is similarly output in the form of packet PA_FC.

Therefore, when a packet PA_FC is input to history processing unit 202, 203 or 204 and when the instruction code OP represents a copy request of the packet as well as a memory access request, the packet copy and the operation on the value of color CL are performed in packet copy circuit 302, and each of the copied packets performs prescribed memory access including an address calculation using the color CL at memory control unit 30, and output from history processing unit 202, 203 or 204. Therefore, when viewed between the input and output of history processing unit 202, 203 or 204, a plurality of memory access result packets can be obtained from one packet, and thus burst access to the memory is realized.

Now, consider the packet flow rate at the input/output of merge unit 304. In this embodiment, as a practical example, the transfer rate among pipeline stages is assumed to be 140 MHz and the frequency of external clock signal SY_CK is assumed to be 33 MHz. At this time, the output of merge unit 304, that is, the flow rate after merging is 140 Mpackets/sec., and packet flow at the flow rate higher than this is impossible. The packet flow rate from the side of the packet copy circuit 302 (301) to the merge unit 304 is limited by the frequency of the external clock signal SY_CK, as described above. Therefore, in this example, it is, at the highest, 33 Mpackets/sec.

Therefore, even when a large number of copy request packets arrive at the packet copy circuit 302 (301), copying is done at a rate not exceeding 33 Mpackets/sec., and therefore the flow rate on the other side of branching is surely provided with the bandwidth of at least 140−33=107 Mpackets/sec. More specifically, the flow rate of the original circulating packets related to the processing by the data driven type information processing apparatus as a whole is ensured to be 107 Mpackets/sec. at the lowest, and therefore, stall of the data driven type information processing apparatus 201 caused by the fatal packet copying can be prevented.

As described above, in the embodiment of the present invention, a packet counter managing the number of packet copies and a comparator performing determination as to the completion of packet copying operation making reference to the packet counter are provided, the copying operation is started using an input of a copy request packet as a trigger, the external clock signal is used as an input to the self synchronous transfer control circuit for controlling the transfer operation, the packet is copied one by one in synchronization with the clock input, and the copying operation is repeated until the designated number of packet copies indicated by the copy request packet is reached, whereby successive copying by the hardware is realized, and compared with the copies taken by a program, the speed of execution can significantly be improved.

Therefore, the time necessary for copying hardly causes a bottleneck in the overall processing time. Further, as the copy is done in synchronization with the external clock signal, copying at a rate exceeding the period of the external clock signal never occurs.

In the packet copy circuit in accordance with the present embodiment, it is possible to perform copying of a packet while operating a value of a certain packet field. When the color field of the copy packets output in response to one copy request packet is set to values different from each other, and a memory access function unit is arranged immediately after the packet copy circuit, it becomes possible for the copied packets to perform address calculation using the mutually different values of color fields, and hence to access to memory addresses different from each other.

Therefore, by combining the packet copy circuit and the memory access function unit of the present embodiment, the burst memory access function can be realized easily. Consider that one frame of an unfixed length of one packet is burst-read from the memory using the memory burst function. In addition to said function, when the value of a node number field of the last one of the plurality of copied packets output in response to one copy request packet is set to a different value, only the last packet of the read frame comes to have a different node number field. Therefore, even when one read frame is divided into a plurality of unspecified number of packets and flow in the data driven type information processing apparatus as a group of packets of an unspecified number, the last packet of the frame can easily be identified by making a reference to the node number field. When the last packet is identified based on the node number field, it is possible to make a transition to the final processing of the frame easily, by branching the last packet only by the program.

Further, in the configuration of the history processing unit of the data driven type information processing apparatus in accordance with the embodiment of the invention, the path through the packet copy circuit and the path through which a packet not related to copying passes are branched and positioned parallel to each other, and therefore, operations on these paths do not directly interfere with each other. Even when the packet copy circuit is in operation, a packet not related to the copy arriving later is branched to flow to the other path. Therefore, the copy process does not cause any fatal packet convergence.

Further, as a packet FIFO is provided in the preceding stage of the pipeline of the packet copy circuit after branching, the waiting state of the copy request packets arriving successively can be absorbed, and influence to the path on the other side is prevented. As to the packet flow rate after merging of the paths, from the packet copy circuit, no packet is output at a rate that is not slower than the frequency of the external clock. Therefore, the flow rate of the other path surely has at least the bandwidth corresponding to the transfer rate between pipeline stages minus the frequency of the external clock.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processing apparatus including a packet copy circuit for successively copying a packet, wherein said packet copy circuit includes a self-synchronous transfer control circuit controlling a transfer operation at an arbitrarily timing, a copy circuit responsive to an input of a copy request packet, for copying a packet one by one in synchronization with a clock signal from said self-synchronous transfer control circuit, a counting circuit for counting the number of packets copied by said copy circuit, and a comparing circuit comparing the number of copies designated by said copy request packet and the number of copies counted by said counting circuit, and determining completion of a copying operation when the designated number of copies is made.

2. The data driven type information processing apparatus according to claim 1, further comprising a packet updating circuit performing, on a value of a certain area in the copied packet, every time a packet is copied by said copy circuit, a prescribed updating operation every time the copy is taken, starting from said copy request packet, and providing the packet after the prescribed updating operation.

3. The data driven type information processing apparatus according to claim 1, further comprising a circuit performing, when copies of the packet by the number designated by said copy circuit are made, a predetermined updating operation on a certain area of the last copied packet.

4. The data driven type information processing apparatus according to claim 1, further comprising a branching circuit provided on an input side of said copy circuit, branching a circulating packet and said copy request packet, and providing the copy request packet to said copy circuit, and a merge circuit for merging the circulating packet branched by said branching circuit with the packet copied by said copy circuit.

5. The data driven type information processing apparatus according to claim 4, further comprising
  a storage circuit provided between said branching circuit and said copy circuit, for successively storing said copy request packet to be applied to said copy circuit.

6. The data driven type information processing apparatus according to claim 1, wherein
said packet includes an instruction field, a node number field and a data field, said data field representing number of copies of the packet, so that said packet serves as a copy request packet.

* * * * *